July 23, 1968     P. A. HOAGLUND     3,393,597

MASKING DEVICE

Filed July 11, 1966     2 Sheets-Sheet 1

INVENTOR.
PAUL A. HOAGLUND
BY Merchant & Gould
ATTORNEYS

July 23, 1968  P. A. HOAGLUND  3,393,597
MASKING DEVICE

Filed July 11, 1966  2 Sheets-Sheet 2

INVENTOR.
PAUL A. HOAGLUND
BY Merchant & Gould
ATTORNEYS

United States Patent Office
3,393,597
Patented July 23, 1968

3,393,597
MASKING DEVICE
Paul A. Hoaglund, % Helps Co., 4037 Thrushwood
Lane, Minnetonka, Minn. 55343
Filed July 11, 1966, Ser. No. 564,412
1 Claim. (Cl. 85—1)

ABSTRACT OF THE DISCLOSURE

A masking device including a body composed of material resistant to the type of acid being utilized having a surface with a desired shape adapted to be positioned in abutting relationship with the object to be masked and further having a threaded axial opening therein to mount the body in tight abutting engagement with the object to be masked. The service of the body in abutment with the object has a depression therein spaced radially inwardly from the periphery and extending around the periphery to provide a seal to prevent the infiltration of acid or the like between the masking device and the object.

---

This invention pertains to a masking device and more particularly to a masking device to prevent acids, which are utilized in such processes as anodizing and the like, from reacting with portions of the metal object being acted upon.

In this specification anodizing is the process used for explanational purposes and referred to throughout. However, it should be understood that the present device can be utilized for a great variety of different processes all of which come within the scope of this invention.

In the prior art before a device is anodized studs and other portions thereof, which it is desired to maintain unmarred by the acid, are masked with masking tape or the like. In general the use of masking tape and the like for this purpose is very undesirable because it does not totally exclude the acid and the studs, etc., are at least partially damaged in many instances. Also, masking tape and the like requires much time and effort to position correctly and, even with the expenditure of much time, it is very difficult to cover exactly the portion of the metal which is to be protected.

In the present invention a first body portion composed of material resistant to the type of acid being utilized, such as plastic or the like, is fixedly attached over the stud or other portion of the metal which it is desired to protect. The body portion has an axial recess therein adapted to threadedly receive the stud and a surface which abuts the metal around the stud. The surface of the body portion has a desired shape, such as round or the like, and effectively masks exactly the portion of the metal to be protected as well as the entire stud. The surface of the body portion which abuts the metal has a depression therein spaced from the edge of said surface and extending therealong substantially the entire length to provide a seal against the entrance of acids and the like thereunder.

If the portion of the metal to be protected consists of a hole and the surrounding area a second body portion is utilized having an axial recess therein and a threaded shaft connects the two body portions so they abut the metal on either side thereof. A great variety of shapes and sizes of body portions can be supplied so that any desirable portion of the metal can be easily masked. Because the body portions are simply threaded onto a stud or shaft the metal can be quickly and easily prepared for anodizing and once the process is completed the masking devices are easily removed. In addition to providing complete protection for desired areas of the metal, the present masking device is reusable and, therefore, very economical.

It is an object of the present invention to provide a new and improved masking device.

It is a further object of the present invention to provide a masking device which is extremely easy to apply and accurately protects the desired surface area.

It is a further object of the present invention to provide a masking device which is highly efficient and economical.

These and other objects of this invention will become apparent to those skilled in the art upon consideration of the accompanying specification, claim and drawings.

Referring to the drawings, wherein like characters indicate like parts throughout the figures.

Figure 1:
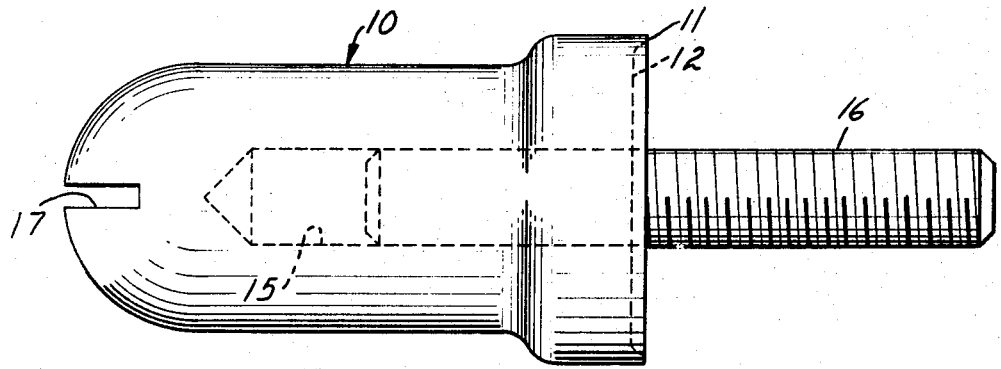
FIG. 1 is a view in side elevation illustrating the present masking device.
Figure 2:
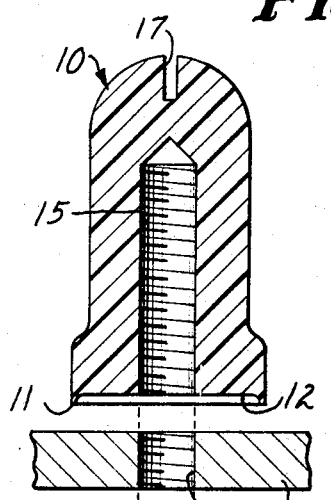
FIG. 2 is an end view of the device illustrated in FIG. 1 as seen from the right end thereof.

In the FIGURES 1–4 the numeral 10 generally designates a first body portion formed in an elongated cap-like or dome-like shape. At the right end of the body portion 10, as viewed in FIG. 1, is a substantially flat surface 11 having an approximately circular shape. The shape of the surface 11 should be approximately the same as the portion of the metal which it is desired to maintain unaffected by acid or the like. The surface 11 has a depression 12 therein spaced from the edge of the surface 11 and extending therealong substantially its entire length which depression 12 forms a relatively high pressure chamber when the outer edges of the surface 11 are forced into tight abutting relationship with a metal surface. The body portion 10 has an axial recess 15 extending from the surface 11 partially therethrough. The recess 15 may be prethreaded to receive a portion of a threaded shaft 16 therein or in the event a stud which is fixedly attached to the metal is to be protected, the recess 15 may have plane sides with a diameter slightly smaller than the outer diameter of the stud so that the body portion 10 may simply be threaded thereon. The left end of the body portion 10 is rounded and has a slot 17 cut therein, which slot is adapted to receive a screwdriver or the like for engaging the body portion 10 over the shaft 16.

Figure 3:
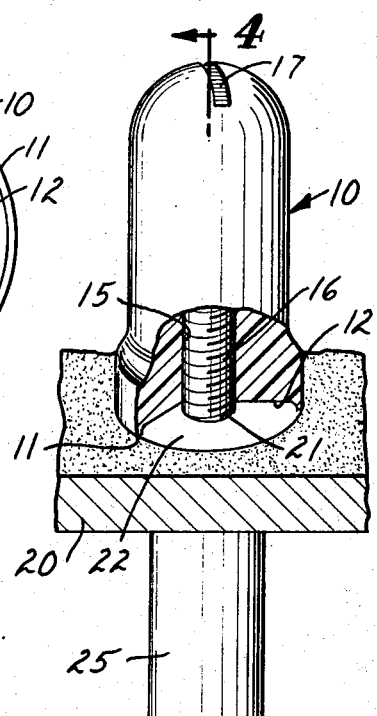
FIG. 3 is a view in perspective of the device illustrated in FIG. 1 somewhat diminished in size with a second body portion attached thereto, parts thereof broken away and shown in section.
Figure 4:
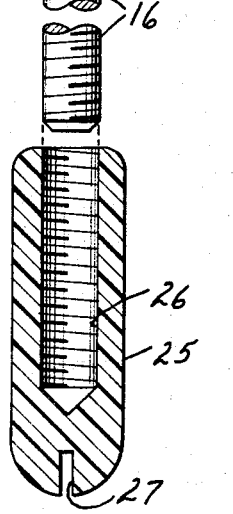
FIG. 4 is an exploded view shown in section as seen from the line 4—4 in FIG. 3.

In FIGS. 3 and 4 a portion of a metal plate 20 is illustrated which has an opening 21 therethrough and a circular portion 22 on the upper surface thereof surrounding the opening 21 which it is desired to protect from the action of acid in the anodizing process. In the FIGS. 3 and 4 the body portion 10 with the threaded shaft 16 fixedly engaged therein is placed coaxially over the circular portion 22 with the shaft 16 engaged in the opening 21. A second body portion 25, which is also formed in a cap or dome-like shape and has a threaded axial recess 26 therein, is threadedly engaged over the other end of the shaft 16 so that is butts against the lower surface of the plate 20. The second body portion 25 also has a notch 27 cut in the lower or rounded end thereof which is adapted to receive a screwdriver therein. Thus, the first body portion 10 and the shaft 16 are placed in the opening 21 and the second body portion 25 is threadedly engaged over the shaft 16 so that the surface 11 of the first body portion 10 is pulled into tight abutting engagement with the upper surface of the plate 20 and completely protects the circular portion 22.

Figure 5:
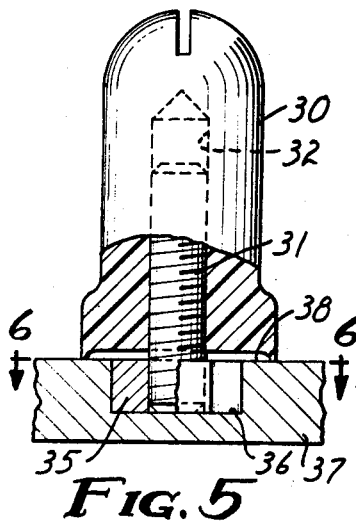
FIG. 5 is a view in side elevation of another embodiment of the present invention, parts thereof broken away and shown in section.
Figure 6:
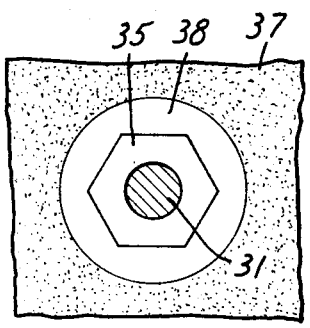
FIG. 6 is a sectional view as seen from the line 6—6 in FIG. 5.

In FIGS. 5 and 6 another embodiment of the present invention is illustrated wherein a body portion 30 similar to the body portion 10 is utilized but a somewhat shorter threaded shaft 31 is engaged in an axial recess 32 in the body portion 30. In this embodiment a nut 35 is fixedly set into a recess 36 in a metal plate 37. It is desired to protect the nut 35, the recess 36 and a small circular area 38 immediately therearound from the corrosive effects of the anodizing acid. To fixedly attach the body portion 30 over the recess 36 and the circular portion 38 of the plate 37 surrounding the recess 36, the shaft 31 fixedly engaged in the recess 32 of the body portion 30 is threaded into the nut 35 far enough to bring the surface of the body portion 30 into tight abutting engagement with the plate 37 and overlying the portion 38.

Figure 7:
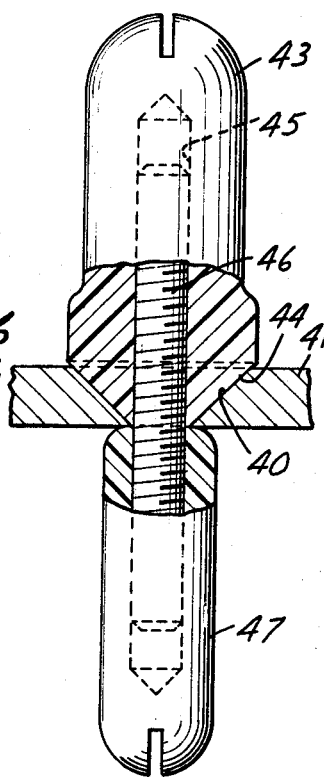
FIG. 7 is a view in side elevation of yet another embodiment of the present invention, parts thereof broken away and shown in section.

In FIG. 7 a further embodiment of the present invention is illustrated wherein it is desired to protect the surfaces of a countersunk or conical shaped opening 40 in a metal plate 41 from the acids of the anodizing process. A body portion 43 having a somewhat dome-like shape similar to the body portion 10 of the first embodiment is utilized. However, the body portion 43 has a lower or abutting surface 44 which is conical shaped to fit the opening 40 and extends therethrough to approximately the lower surface of the plate 41. The body portion 43 has an axial recess 45 therein with a threaded shaft 46 fixedly engaged in the recess 45. Threaded shaft 46 extends through the opening 40 and is threadedly engaged in a second body portion 47 which is similar to the second body portion 25 of the first embodiment. Thus, in this embodiment the body portion 43 prevents any of the anodizing acids from entering the opening 40 and affecting the surfaces thereof.

Figure 8:
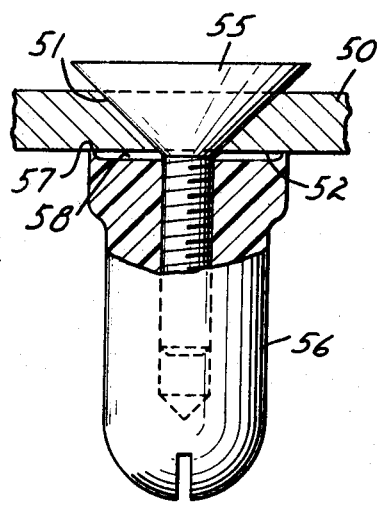
FIG. 8 is a view in side elevation of still another embodiment of the present invention, parts thereof broken away and shown in section.

In FIG. 8 a plate 50 is illustrated with a countersunk opening 51 therethrough, similar to the opening 40 through the plate 41 in FIG. 7. In this particular embodiment it is desired to protect a circular portion 52 of the plate 50 encircling the opening 51 on the lower surface of the plate 50. A flat-headed bolt 55 is positioned in the opening 51 so that the head covers the surfaces of the opening 51. The opening 51 may be countersunk at an angle such that a standard bolt or screw will fit therein or it may require a special bolt. A protective body portion 56 which is similar to the body portion 10 of FIG. 1 is threadedly engaged on the shank of the bolt 55 so that the surface 57 having a depression 58 therein is in abutment with the lower surface of the metal plate 50 and overlying the portion 52 thereof. It should be understood that the body portion 43 might also be utilized in place of the bolt 55 or any other combination of the prior described body portions might be utilized.

Thus, a masking device has been described which is quickly and efficiently applied to a surface, stud, openings in a plate, nuts set in an opening in a plate, etc. Also, the present masking device provides a good seal over the portion which it is desired to protect so that acids and the like do not leak therethrough. In addition, the present masking device can be formed to protect any desired surface and is reusable.

While I have shown and described a specific embodiment of this invention, further modifications and improvements will occur to those skilled in the art. I desire it to be understood, therefore, that this invention is not limited to the particular forms shown and I intend in the appended claim to cover all modifications which do not depart from the spirit and scope of this invention.

I claim:
1. A masking device to prevent acids from reacting with portions of a metal object during certain processes comprising:
   (a) a first body portion composed of material resistant to the type of acid being utilized;
   (b) said first body portion having a surface with a desired shape adapted to be positioned in abutting relationship with a surface of the metal object;
   (c) said surface of said first body portion having a depression therein spaced from the edge of said surface and extending therealong substantially the entire length thereof to form a sealed chamber in cooperation with the metal object and substantially prevent the infiltration of acid therein;
   (d) an axially extending recess in said first body portion adapted to receive one end of a threaded shaft therein;
   (e) a second body portion composed of material resistant to the type of acid being utilized;
   (f) an axially extending recess in said second body portion adapted to receive one end of a threaded shaft therein; and
   (g) a shaft having an axial length slightly shorter than the combined lengths of said recesses in said first and second body portions and the width of the metal object and having threads along substantially the entire length thereof.

References Cited
UNITED STATES PATENTS

| | | | |
|---|---|---|---|
| 1,422,964 | 7/1922 | Greenbaum | 118—505 |
| 1,826,988 | 10/1931 | Campbell | 85—42 |
| 2,358,151 | 9/1944 | Duggan | 118—505 |
| 2,726,009 | 12/1955 | Murdock et al. | 85—1 |
| 2,820,757 | 1/1958 | Belke | 204—297 |
| 3,273,441 | 9/1966 | Biesecker | 85—35 |

FOREIGN PATENTS

| | | |
|---|---|---|
| 933,050 | 7/1963 | Great Britain. |

MARION PARSONS, JR., *Primary Examiner.*